(No Model.)
D. B. GRAY.
CAR COUPLING.
No. 338,149. Patented Mar. 16, 1886.
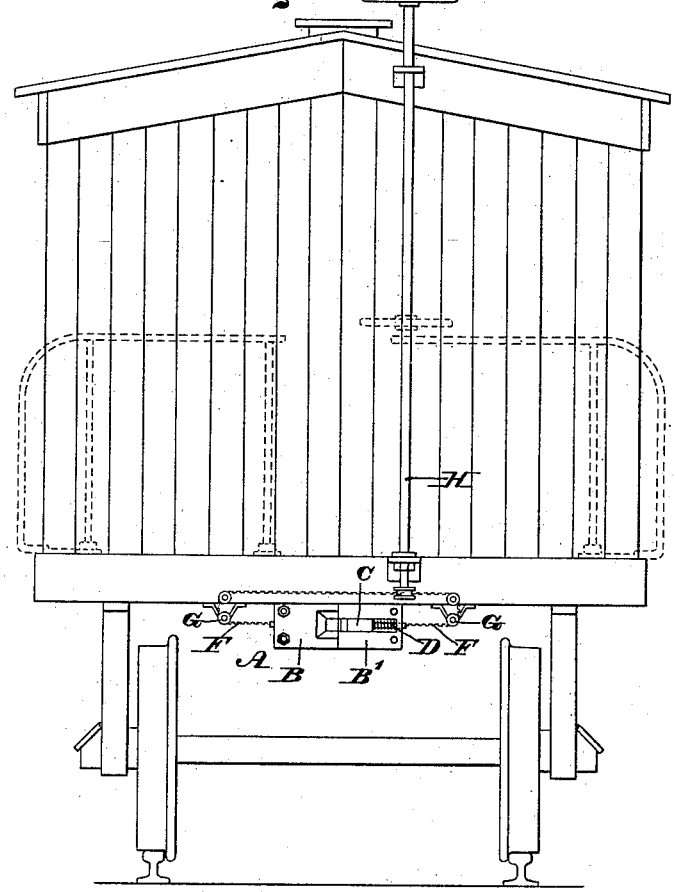
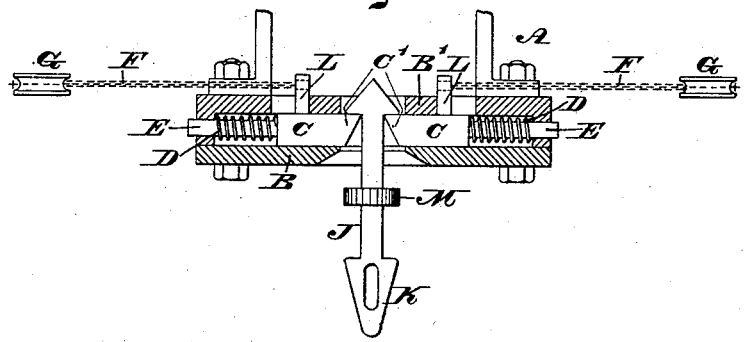
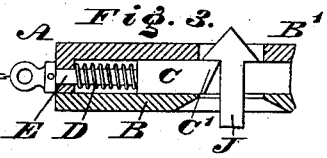
WITNESSES:
Th. Rolle.
W. F. Kirchen
INVENTOR:
D. B. Gray
BY John A. Wiedersheim
ATTORNEY.

United States Patent Office.

DELBERT B. GRAY, OF PHILADELPHIA, PENNSYLVANIA.

CAR-COUPLING.

SPECIFICATION forming part of Letters Patent No. 338,149, dated March 16, 1886.

Application filed September 30, 1885. Serial No. 178,605. (No model.)

*To all whom it may concern:*

Be it known that I, DELBERT B. GRAY, a citizen of the United States, residing in the city and county of Philadelphia, State of Pennsylvania, have invented a new and useful Improvement in Car-Couplings, which improvement is fully set forth in the following specification and accompanying drawings, in which—

Figure 1 represents a front view of a car-coupling embodying my invention. Fig. 2 represents a horizontal section thereof on an enlarged scale. Fig. 3 represents a horizontal section of a modification.

Similar letters of reference indicate corresponding parts in the several figures.

My invention consists of an automatic car-coupling, as will be hereinafter set forth.

Referring to the drawings, A represents a draw-head, which is secured to a car in suitable manner and formed of the front and rear walls, B B', properly bolted together. Fitted between the walls B B' are laterally moving or sliding jaws C, which have noses C' at their inner ends, and are pressed toward each other by means of springs D, which encircle the guide-rods E of the jaws and bear against shoulders on the jaws, said guides E passing through openings in the side walls of the draw-head.

Connected with the jaws C are cords or chains F, which pass around pulleys G, the latter being mounted on the cars, said chains being connected with the rod H, whereby by the rotation of the latter the chains are wound thereon, and the jaws C are thereby moved in opposite directions, thus separating the same for uncoupling purposes.

When the cars approach each other, the pointed, conical, or spear-shaped head of the coupling-link J enters the draw-head between the jaws C, and forces the latter apart. When the shoulder of the head clears the back of the jaws, the springs force the jaws toward each other, causing the noses of the same to take firm hold of the head of the link, (see Fig. 2,) thus coupling the cars. When the cars are to be uncoupled, the rod H is rotated, whereby the jaws are separated and the head of the link clears the same.

In order to adapt the coupling-link both for a car having an automatic coupler and one having the usual coupling-pin, I form one end of the link with a conical or spear-shaped head and the opposite end with an eye, K, the latter being adapted to receive said coupling-pin, while the head on the opposite end engages with the jaws C, as hereinbefore described.

In order to set back the chains F and avoid location of the same beyond the platform, there are attached to the backs of the jaws C, lugs Z, the same projecting through slots A' in the rear walls of the draw-head, and having the chains F attached to them, whereby said chains and the pulleys G are back of the draw-head.

At or about the center of the coupling-link is a shoulder, M, which is preferably circular and of diameter greater than the opening in the front wall of the draw-head, so that when the cars approach said shoulder strikes said front wall, and thus controls the extent of entrance of the link into the draw-head.

Having thus described my invention, what I claim as new, and desire to secure by Letters Patent, is—

1. In an automatic car-coupling device, a draw-head having front and rear walls, B B', the said rear wall having slots A', in combination with spring-pressed jaws C, guided between said walls and provided with lugs L, projecting through said slots A', substantially as described.

2. An automatic car-coupling consisting of a draw-head having front and rear walls, the latter having slots therein, spring-pressed jaws having stems projecting through the side walls and lugs projecting through the rear wall of the said draw-head, the said lugs being connected to gearing for operating said jaws, and a coupling-link having an end adapted to be held between said jaws, all of said parts being arranged, combined, and operating substantially as described.

3. A draw-head having front and rear walls, B B', spring-pressed jaws C, fitted between said walls, chains F, connected directly with said jaws for opening the jaws, and the rod H, for winding said chains, substantially as described.

DELBERT B. GRAY.

Witnesses:
JOHN A. WIEDERSHEIM,
A. P. GRANT.